(12) United States Patent  (10) Patent No.: US 6,295,462 B1
Kudoh                     (45) Date of Patent:     Sep. 25, 2001

(54) PORTABLE RADIO INFORMATION TERMINAL

(75) Inventor: Kazuhiro Kudoh, Shizuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/216,930

(22) Filed: Dec. 21, 1998

(30) Foreign Application Priority Data

Dec. 19, 1997 (JP) .................................................. 9-350745

(51) Int. Cl.[7] .............................. H04B 1/38; H04M 1/00
(52) U.S. Cl. ........................ 455/562; 455/550; 455/575; 343/702; 343/841
(58) Field of Search ...................................... 455/562, 575, 455/550, 556; 343/702, 841; 379/433

(56) References Cited

U.S. PATENT DOCUMENTS 4,958,382 * 9/1990 Imanishi ................................ 343/702
5,554,996 * 9/1996 Chatzipetros ......................... 455/575
5,990,838 * 11/1999 Burns et al. ........................... 343/702

* cited by examiner

*Primary Examiner*—Dwayne Bost
*Assistant Examiner*—Lewis G. West
(74) *Attorney, Agent, or Firm*—Young & Thompson

(57) ABSTRACT

A portable radio information terminal is provided that can prevent the radio section built in the cover for covering the main body from being adversely affected by noises generated in the information processing section built in the main body. The main body 1 includes an information processing section which chiefly consists of a control section acting as a main noise generating source. The cover 2, which covers the upper surface of the main body 1, includes a radio section 17 containing the receiving section, a whip antenna 7 and an inverted-F antenna 9. The cover 2 is mechanically coupled to the main body 1 by means of the shaft 20. The ground conductor 8 for the inverted-F antenna 9 is disposed on the back surface of the cover 2, or faces the upper surface of the main body 1, to effectively block noises from the main body 1. The terminal includes the whip antenna 7 and the inverted-F antenna 9 each disposed at the end of the cover 2. With the cover closed, the inverted-F antenna 9 with a large gain can receive signals. With the cover opened, the diversity reception can be performed using both the whip antenna 7 and the inverted-F antenna 9.

15 Claims, 7 Drawing Sheets

PRIOR ART

PORTABLE RADIO INFORMATION TERMINAL

BACKGROUND OF THE INVENTION

The present invention relates to a portable radio information terminal that has a radio communication function (radio section) and an information processing function (information processing section), and particularly to an antenna configuration for portable radio information terminals.

Conventionally, the portable radio information terminal of that type has the disadvantage in that noises radiated via an antenna from the information processing section adversely affect the radio section, particularly the receiving system, thus deteriorating the radio characteristics, particularly, the S/N ratio of a received radio signal (that is, deteriorating the receiving sensitivity).

One approach of solving that problem is to divide the portable radio information terminal into two parts including the main body and the cover. For example, the main body includes the information processing section and a display on the front surface of the main body. The cover is placed on the front surface of the main body and includes the radio section and an antenna. As generally used in the cellular telephones, the antenna selective diversity receiving system may be employed where plural antennas are disposed on the radio section and reception radio signals are received by selecting an antenna with a strong reception field strength.

FIG. 7 is a block diagram illustrating the configuration of a portable radio information terminal employing the above-mentioned technique.

In the portable radio information terminal, the information processing section is built in the main body while the radio section is built in the cover 2B. The cover 2B is mechanically coupled to the main body 1A by means of the shaft 20 such as a hinge shaft. The cover 2B is opened and closed to the front surface of the main body 1A by turning around the shaft 20 acting a rotating shaft.

The main body 1A includes a battery 3 acting as a power source for the information terminal and a control section 4B that processes information such as data or digital signals to be output from and input to the cover 2B. In the information terminal, the display 5 disposed on the display section of the main body 1A displays image information. A pressure sensitive device (e.g. touch panel) is attached on the display 5. The information processing procedure is performed by inputting the operation signal to the control section 4B via the input section 6. Normally, the information processing section consists of the control section 4B, the display section 5 and the input section 5, excluding the battery 3.

The cover 2B includes two antennas, that is, a whip antenna 7 being a whiplike conductor protruding from the cover 2B and an inverted-F antenna 9A disposed on the bottom (back) surface of the cover 2B. In the cover 2B, the radio section consists of a transmission section 13 that produces transmission radio signals, an antenna switch 16 that selects a reception radio signal received via the antenna 7 or 9, a receiving section 11 that converts a selected reception radio signal to a desired frequency and a desired level and then amplifies the converted signal acting as a received signal, a circulator 10 that transmits a transmission radio signal to the switch 16 and transmits a reception radio signal from the switch 16 to the receiving section 11, and a modulator and demodulator section 12 that modulates data or digital signal from the control section 4B and then transmits the modulated signal to the transmission section 13 and that demodulates a reception signal from the receiving section 11 and then transmits a digital signal being the demodulated data to the control section 4B. The demodulation section 12B includes a radio control section that controls the radio section. The radio control section selectively controls the frequency of a transmission signal and the frequency of a reception signal, controls the level of a radio signal output from the transmission section 13, and selectively controls the antenna switch 16. The circulator 10 acts as an isolator that prevents the input and output signals to and from the antenna 7 or 9 from being adversely affected by the receiving section 11 or transmission section 13 not involved in a transmission or receiving operation.

In the cover 2B, at the time of receiving radio signals, the receiving section 11 amplifies radio signals input from the antenna 7 or 9 via the circulator 10. Then the modulator and demodulator section 12B demodulates the amplified signal into a digital signal. The digital signal is output to the control section 4B of the main body 1A. At the time of transmitting radio signals, the modulation and demodulation section 12B modulates a digital signal output from the control section 4B of the main body 1A. The transmission section 13 amplifies the modulated signal as a transmission radio signal. Then the antenna 7 radiates the radio signal via the circulator 10.

The portable radio information terminal, shown in FIG. 7, performs the antenna selective diversity reception using two antennas 7 and 9A. The antenna switch 16 selects the antenna 7 or 9A to be connected to the receiving section 11 at the time of starting the receiving operation. The modulator and demodulator section 12B compares the level of a received signal from the receiving section 11. A desired signal is received by connecting the antenna with a stronger received signal level to the receiving section 11. Normally, since the receiving operation is changed for the transmission operation in a short period in milliseconds, an antenna with a larger received signal level is selected every changing mode.

Where the package is formed of a main body containing the information processing section and a cover for covering the main body and containing the radio section, the above-mentioned portable radio information terminal has the following disadvantage. That is, although the whip antenna can relatively and easily provide the good antenna gain, the metal portion in the main body disposed close to the whip antenna by closing the cover causes a decrease in the antenna gain. Moreover, when the antenna attached to the cover approaches the information processing section acting as a principal noise source of the main body, noises from the information processing section diffracts to the antenna, so that the receiving section of the radio section cannot stably receive reception radio signals.

In the antenna selective diversity reception using plural antennas, when the coupling between a high-gain antenna and the radio section is relatively strong, the use of the high-gain antenna induces the transmission radio signal diffracted from the high-gain transmission antenna to the receiving section. For that reason, in some cases, the constraint occurs that only the low-gain antenna must be used as a transmission antenna. Therefore even when the high-gain antenna decreases its gain due to the approach to the metal portion, the low-gain antenna is forced to be used for transmission.

In other cases, the antenna selective diversity receiving system where an inverted-F antenna is disposed in addition to the whip antenna may be employed for the portable radio information terminal. However, when the cover is in a closed state, noises (transmission radio signals) propagate from the whip antenna to the receiving section, so that the receiving section erroneously detects strong field strength due to the noises. As a result, the diversity reception cannot be stably performed. In order to judge whether or not the strong field strength results from noises or a desired signal, it may be considered to use the means of judging a received data ratio. However, this approach leads to the prolonged judgment time or complicated configuration.

SUMMARY OF THE INVENTION

The objective of the present invention is to solve the above-mentioned tasks.

The objective of the present invention is to provide a portable radio information terminal that can establish good radio communications.

The objective of the present invention is to provide a portable radio information terminal that can prevent noises generated in the information processing section built-in the main body from diffracting to the radio section built-in the cover.

In the portable radio information terminal, the portable radio information terminal comprises a main body containing an information processing section; a cover containing a radio section and covering an upper surface of the main body, wherein the back surface of the cover approaches the upper surface of the main body when said cover is closed while the back surface of the cover is parted from the upper surface of the main body when said cover is opened; a first antenna disposed on an end of the cover; a second antenna having a conductive plane which blocks the magnetic coupling to the cover; and a receiving section for receiving a receive radio signal with the second antenna when the cover is closed and for diversity-receiving the receive radio signal with the first antenna and the second antenna when the cover is opened.

In the portable radio information terminal, the first antenna transmits a transmission radio signal from a transmission section when the cover is in an open state. The second antenna transmits the transmission radio signal when the cover is in a close state.

Moreover, in the portable radio information terminal, the cover further includes a third antenna having a conductive plane which blocks the magnetic coupling to the main body. The receiving section performs diversity-reception using the first antenna and the second antenna when the cover is in an open state and performs diversity-reception using the second antenna and the third antenna when the cover is in a close state.

In the portable radio information terminal according to the present invention, without using the first antenna such as a whip antenna with a strong magnetic-coupling to the main body even when the cover is in a close state, radio signals can be transmitted or antenna-selective-diversity received using the second antenna and/or the third antenna having the conductive plane which can effectively block the magnetic coupling to the main body. As a result, good radio communications can be realized without being adversely affected by noises radiated from the main body while the high gain is maintained.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Embodiments according to the present invention will be described with reference to FIGS. 1, 2, 3, 4, 5 and 6.

Figure 1:
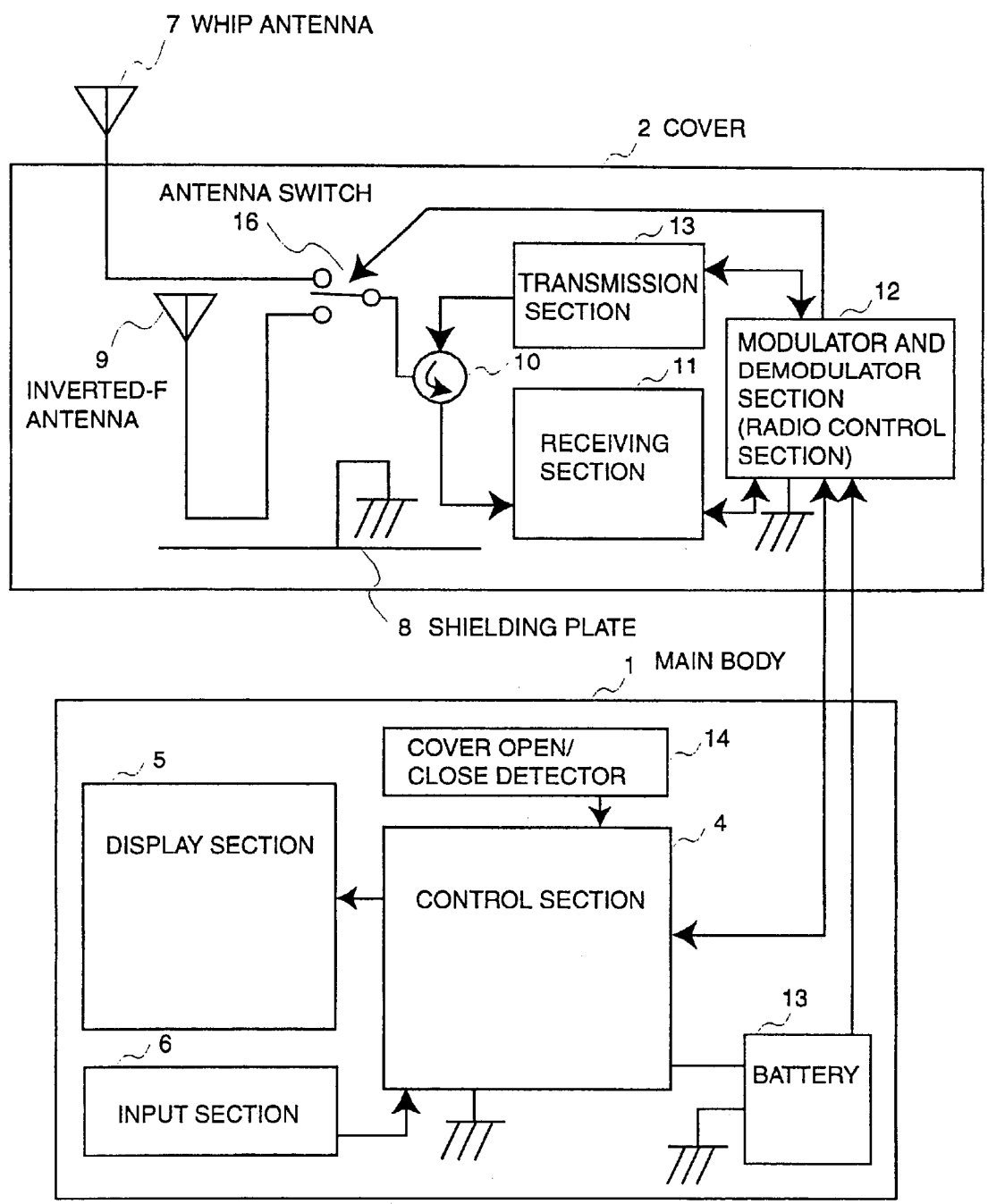
FIG. 1 is a block diagram illustrating a portable radio information terminal according to an embodiment of the present invention.
Figure 2:
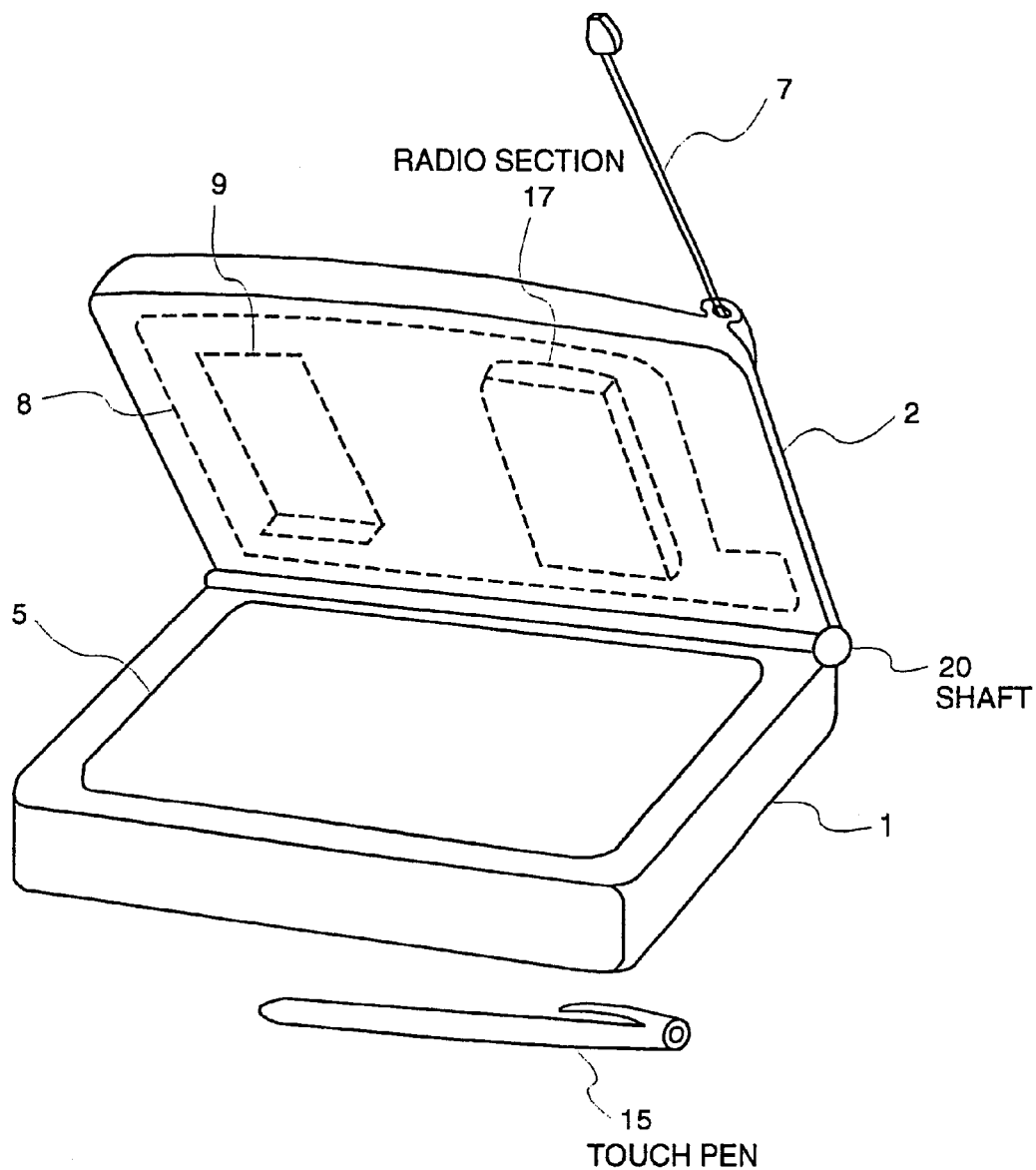
FIG. 2 is a perspective view illustrating the portable radio information terminal, with the cover 2 opened, shown in FIG. 1.

FIG. 1 is a block diagram illustrating the configuration of a portable radio information terminal according to an embodiment of the present invention. FIG. 2 is a perspective view illustrating the portable radio information terminal, with the cover 2 opened, shown in FIG. 1.

Figure 7:
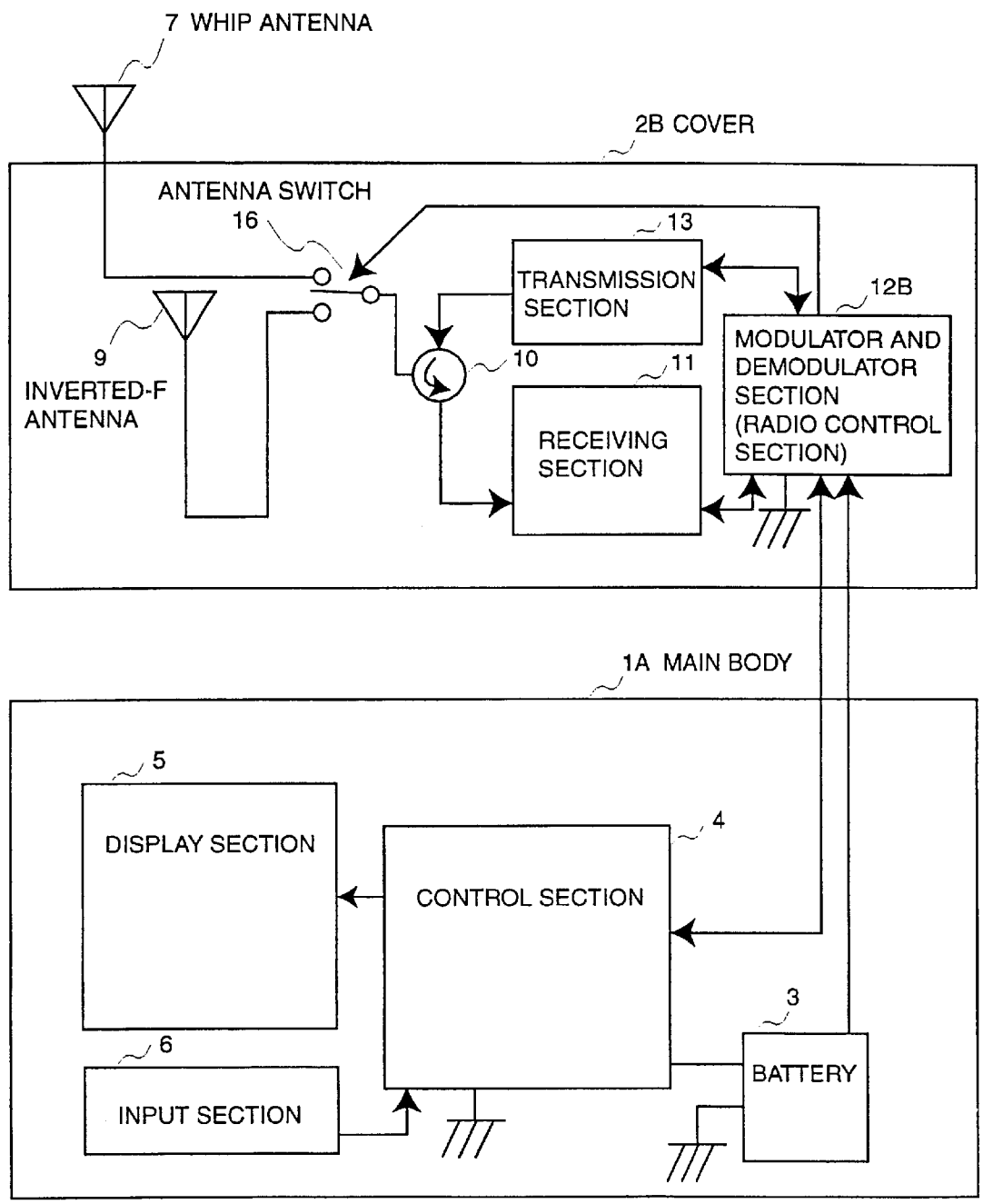
FIG. 7 is a block diagram illustrating the configuration of a prior-art portable radio information terminal.

Referring to FIG. 1, the fundamental configuration of the portable radio information terminal resembles that shown in FIG. 7. A shielding plate 8 and a cover open/close detector 14 are newly added to the configuration in FIG. 7. In FIG. 1, constituent elements represented with reference numerals with no suffixes are basically identical to the corresponding constituent elements shown in FIG. 7 in the operation and configuration, in spite of some differences. For example, the antenna 9 corresponds to that in FIG. 7 but is slightly different in operation and function. The operation and configuration different from those in FIG. 7 will be chiefly described here by referring to FIG. 1.

In the portable radio information terminal, two antennas including a whip antenna 7 and an inverted-F antenna 9 are incorporated in the cover 2. The inverted-F antenna 9 has two conductive planes including a ground conductor grounded to the ground potential (GND) and a radiation conductor confronting the ground conductor and disposed on the front surface of the cover 2. The shielding plate 8 disposed on the bottom (back) surface of the cover 2 and applied to the ground potential (GND) corresponds to the ground conductor. A printed board on which electronic components for the radio section are mounted can be used as the shielding plate 8. An inverted-F type feeding circuit is mounted on the radiation conductor.

The inverted-F antenna 9 shows excellent antenna characteristics independently of opening or closing of the lid 2. The shielding plate 8 attenuates noises propagated from the information processing section in the main body 1 to the radio section to a considerable amount. As the cover 8 is opened together with the inverted-F antenna 9, the surface of the shielding plate 8 becomes perpendicular to the surface of the main body 1, so that the noise shielding amount between the information processing section and the radio section decreases. On the other hand, when the cover 2 is in an open state, the whip antenna 7 is apart from the front surface of the control section 4 or main body 1. As a result, the whip antenna 7 is immune to noises from the information processing section, thus providing its high gain. In the portable radio information terminal, when the cover 2 is in an open state, it is effective to employ the antenna selective diversity receiving system that uses both the whip antenna 7 and the inverted-F antenna 9 to receive radio signals.

When the cover 2 is in a closed state, the gain of the whip antenna 7 decreases under the influence of the conductive portion and the metal portion in the body 1. Since being close to the control section 4 acting as a main noise generating source, the whip antenna 7 tends to be influenced by noises. When the cover 2 is in a closed state, radio signals are received only by the inverted-F antenna 9, without using the whip antenna 7. In the diversity reception system, an antenna is selected according to the level strength of a received signal. Hence, if the whip antenna 7 receives noises, the whip antenna 7 may be selected by the reception signal with a feeble field strength such as that of the noise level, so that the receiving sensitivity is deteriorated. Hence, when the cover 2 is closed, the whip antenna 7 is not used as an antenna for receiving radio signals.

The main body 1 includes the cover open/close detector 14 that detects the cover 2 in an open state when the characteristics of the inverted-F antenna 9 is lower than that of the whip antenna 7 or the cover 2 is opened to the extent of a predetermined amount representable in the S/N ratio. The cover open/close cover detector 14 may be a known microswitch that detects the contact or proximity between the front surface of the main body 1 and the back surface of the cover 2. The control section 4 receives information regarding opening and closure of the cover 2 from the cover open/close cover detector 14. The modulator and demodulator section 12 receives the information regarding opening and closure of the cover to controllably switch the transmission antenna.

Referring to FIG. 2, the display 5 is disposed on the front surface of the main body 1 in the portable radio information terminal. A touch panel acting as an input section 6 is attached underneath of the display 5. Signals can be input to the input section 6 by locally pressing the display 5 with the touch pen 15. The shielding plate 8 grounded at the ground potential (GND) is disposed on the bottom (base) surface of the cover 2. The shield plate 8 (as previously described) is a conductive plane acting as a ground conductor for the inverted-F antenna 9. The inverted-F antenna 9 as well as the radio section 17 which includes the transmission section 13, the receiving section 11, and the modulator and demodulator section 12 are suitably disposed between the shield plate 8 and the front surface of the cover 2. The shield plate 8 shields the radiation conductor of the inverted-F antenna 9 from the main body 1 so that the radiation conductor is immune to noises from the main body 1. The whip antenna 7 is disposed on the end of the cover 2 to protrude the protruding portion thereof. When the cover 2 is opened by turning around the shaft 20, as shown in FIG. 2, the whip antenna 7 with its high gain is not easily influenced by the main body 1. However, when the cover 2 is closed, the antenna gain tends to be deteriorated under the effect of the metal portion and the conductive components in the main body 1 or by noises generated in the control section 4. The shielding plate 8 can be realized by vapor-depositing a metal over inner surface of the cover 2 or the surface of a plastic box.

In the radio signal transmission mode of the portable radio information terminal, when the inverted-F antenna 9 has a sufficient gain in a closed state of the cover 2 and diffraction due to the coupling to the radio section 17 (or the receiving section 11) is small, it is preferable to use the inverted-F antenna 9 rather than the whip antenna 7 which tends to decrease its gain under the effect of the main body 1. In the portable radio information terminal, the radio section 7 and the antennas 7 and 9 are built in the cover 2. Since the size of the cover 2 is substantially determined according to the size of the display section 5 in the main body 1, the cover has its sufficient inner space for assemblies. As a result, there is the advantage in that the inverted-F antenna 9 can be sufficiently isolated from the radio section 17.

Figure 3:
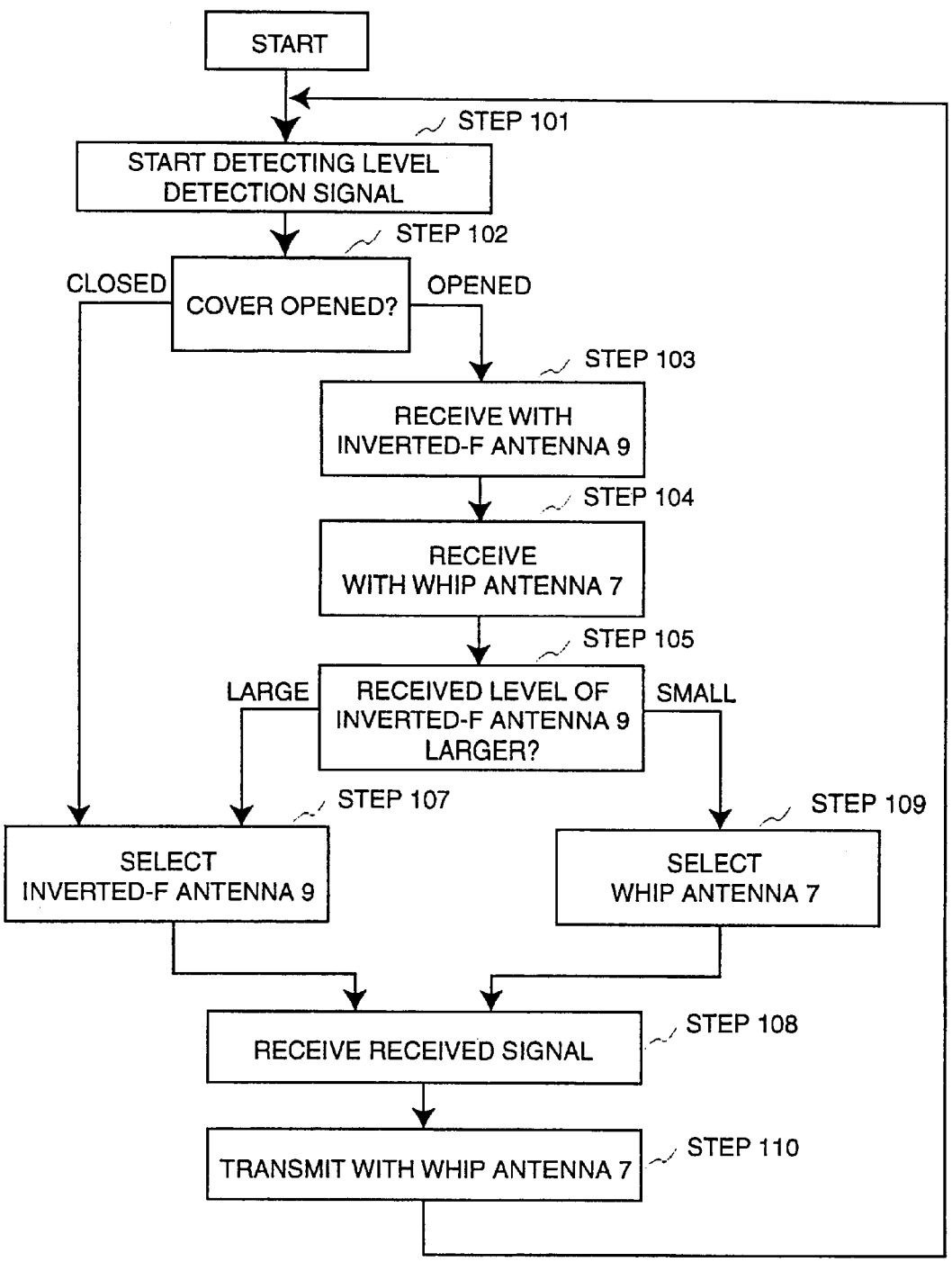
FIG. 3 is a flowchart illustrating the operation of the portable radio information terminal shown in FIG. 1, according to an embodiment of the present invention.

FIG. 3 is a flowchart illustrating the operation of the portable radio information terminal according to an embodiment of the present invention.

The portable radio information terminal shown in FIG. 1 repeatedly transmits and receives data with the radio signals in short time intervals in milliseconds. Hence, when plural antennas are used in the diversity mode, it is necessary to receive a reception level detection radio signal at the time of starting a receiving operation, differently from the reception radio signal necessary as the original information, by selectively switching between the antennas 7 and 9. The radio control section (modulator and demodulator section 12) stands by to receive the reception level of a radio signal to be input to the receiving section 11 (step 101). At this time, the control section 4 receives information about opening or closure of the cover 2 from the cover open/close detector 14 and then informs the radio control section of it (step 102). When the cover 2 is in an open state ("open" in the step 102), the whip antenna 7 is largely separated from the front surface of the control section 4 and the main body 1, so that the whip antenna 7 becomes resistant to noises and has a high gain. As a result, the radio control section diversity-receives the radio signal using the whip antenna 7 and the inverted-F antenna 9.

The radio control section first selects the inverted-F antenna using the antenna switch 16. The receiving section 11 connected to the inverted-F antenna 9 receives the reception level of a radio signal (step 103). Successively, by switching from the antenna switch 16 to the whip antenna 7, the radio control section detects the reception level from the whip antenna 7 (step 104). If the reception level of the inverted-F antenna 9 is larger than that of the whip antenna 7 ("large" in the step 105), the radio control section selects the signal from the inverted-F antenna 9 acting as a reception radio signal (step 107) while the receiving section 11 receives the radio signal from the inverted-F antenna 9 (step 108). In the step 105, if the reception level of the whip antenna 7 is larger than that of the inverted-F antenna ("small" in the step 105), the radio control section selects the signal from the whip antenna 7 acting as a reception radio signal (step 109). The receiving section 11 receives the radio signal from the whip antenna 7 (step 108)

When the cover 2 is in a closed state ("closed" in the step 102), the whip antenna 7 decreases its gain under the influence of the conductive portion and metal portion in the main body 1 and is influenced by noises from the control section 4 close to the whip antenna 7. In this case, the receiving section 11 receives only the radio signal from the inverted-F antenna 9, without using the whip antenna 7, (steps 107 and 108). In the antenna selective diversity reception system, an antenna is selected by judging the strength of a reception signal level. Hence, when the receiving section 11 receives noises from the whip antenna 7, a radio signal with a feeble electric field at a noise level cause the receiving section 11 to select the whip antenna 7, so that the reception sensitivity is deteriorated. For that reason, the whip antenna 7 is not used.

In the portable radio information terminal, the transmission operation is performed after the receiving operation. In the transmission mode, since the high level of the transmission radio signal makes the influence of noises from the information processing section relatively small, the whip antenna 7 is used to transmit radio signals (step 110). In this example, the whip antenna 7 is used because its high gain capability can be easily realized, compared with the inverted-F antenna 9. The inverted-F antenna 9 can be sufficiently used as the transmission antenna by effectively utilizing the structure of the cover 2 and securing a sufficient box size and sufficient isolation to the radio section 17.

When a radio signal has been completely transmitted in a unit period of time, the receiving operation is resumed (step 101). Actually, the time interval between reception and transmission or between the transmission and the next reception corresponds to the length time-divided to another terminal.

Figure 4:
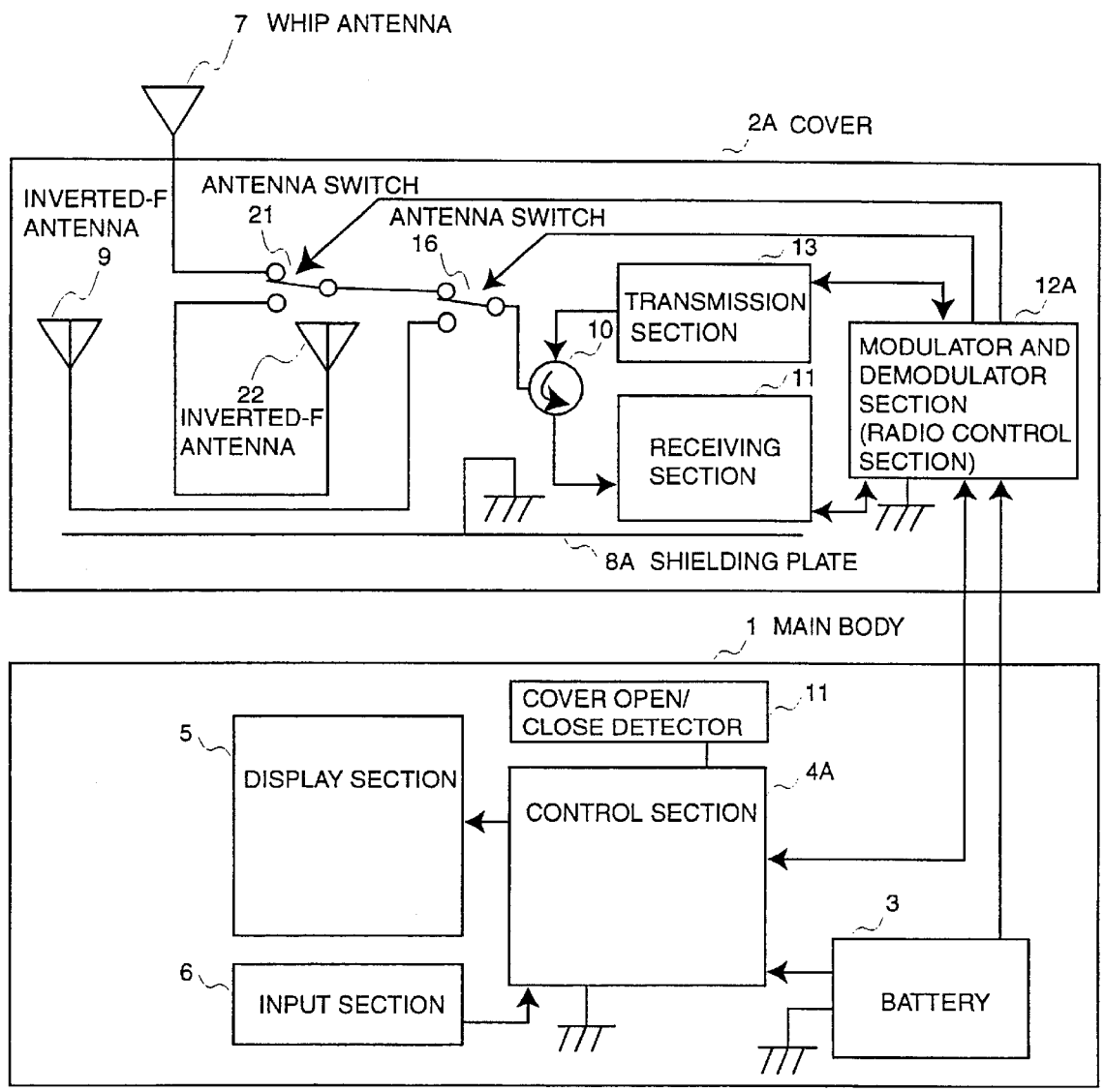
FIG. 4 is block diagram illustrating a portable radio information terminal according to another embodiment of the present invention.
Figure 5:
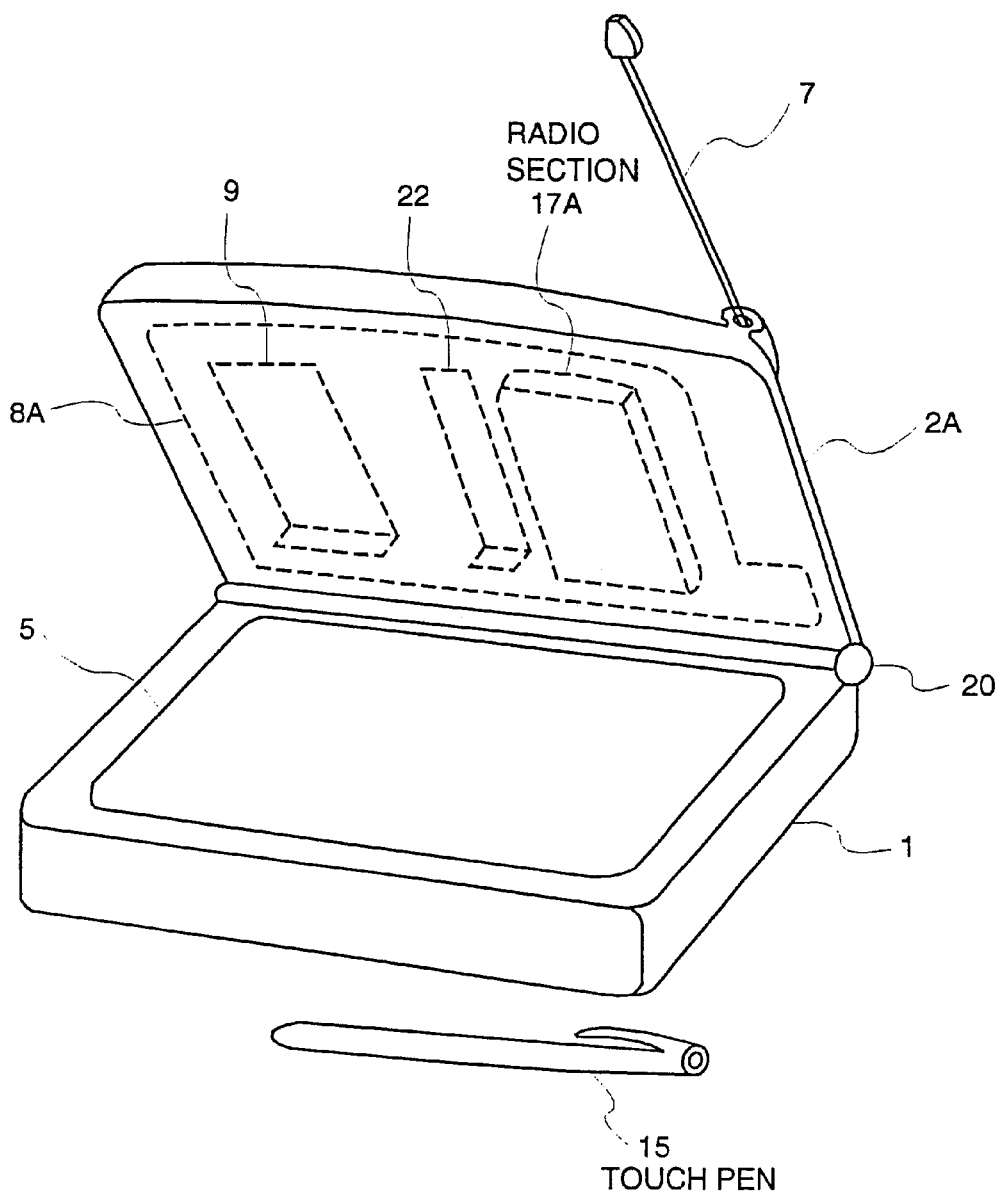
FIG. 5 is a perspective view illustrating the portable radio information terminal, with the cover 2A opened, shown in FIG. 4.

FIG. 4 is a block diagram illustrating the configuration of the portable radio information terminal according to another embodiment of the present invention. FIG. 5 is a perspective view illustrating the portable radio information terminal, with the cover 2A opened, of FIG. 4.

Referring to FIGS. 4 and 5, the portable radio information terminal includes an antenna switch 21 and an inverted-F antenna 22 mounted to the cover 2 in the portable radio information terminal shown in FIG. 2. Adding the antenna switch 21 and the inverted-F antenna 22 requires somewhat modifying the functions of the cover 2, the shielding plate 8, the control section 4 and the modulator and demodulator section (radio control section) shown in FIG. 1. The suffixes A added to the reference numerals represent differences between the constituent elements and the corresponding constituent elements shown in FIG. 1. Differences between the constituent elements in FIG. 2 and the corresponding constituent elements in FIG. 1 will be described below by referring to FIGS. 4 and 5.

In the portable radio information terminal, the inverted-F antenna 9 is positioned apart from the radio section 17 and provides a high gain when the cover 2A is in a closed state. Meanwhile, the inverted-F antenna 22 is positioned near the radio section 17 and has a lower gain than the inverted-F antenna 9. For that reason, the inverted-F antenna has a stronger coupling to the radio section 17 than the inverted-F antenna 9. A shielding plate 8A is used as a ground conductor (conductive plane) to the inverted-F antennas 9 and 22. The shielding plate 8A has the effect of shielding the radio section 17 from noises generated from the control section 4A in the main body 1.

The inverted-F antenna 22 is used only for the diversity reception while the cover is in a closed state. The inverted-F antenna 9 is used for the diversity reception and transmission, regardless of the cover 2A closed or opened. When the cover 2A is in an open state, the whip antenna 7 performs the diversity reception, together with the inverted-F antenna 9 apart from the radio section 17. The antenna 7 or 9 selected at the reception time is used at the transmission time.

The antenna switch 21 selects the whip antenna 7 or the inverted-F antenna 22. The antenna switch 16 selects the common terminal of the antenna switch 21 or the inverted-F switch 9. This switching operation is performed under the control of the radio control section, in consideration of the opening or closure of the cover 2.

Referring to FIG. 5, the shield plate 8A at the ground potential (GND) is disposed on the bottom (back) surface of the cover 2A. The radio section 17 and the inverted-F antenna 9 or 22 are disposed toward the outer surface of the cover 2A. The inverted-F antenna 22 is used for reception only because it arranged near to the radio section 17 and is strongly coupled with the radio section 17. On the other hand, the inverted-F antenna 9 is used for transmission and reception because it is spatially and sufficiently separated from the radio section 17 and has a high gain capability. The shielding plate 8A shields the inverted-F antennas 9 and 22 from the main body 1 so that the inverted-F antenna 9 and 22 are resistant to the influence of noises. The whip antenna 7 is disposed on the end of the cover 2A, in a similar manner to that in FIG. 2. As shown in FIG. 5, when the cover 2A is in an open state, the whip antenna 7 has a high gain capability and is difficult to be influenced by the main body 2A. However, when the cover 2A is closed, the gain of the whip antenna 7 would be deteriorated under the influence of the metal portion conductive component in the main body 1.

The printed board, on which electronic components for the radio section 17 are mounted, can be used as the shield plate 8A. Moreover, the shielding plate 8A can be realized by vapor-depositing a metal on the inner portion or surface of the cover 2A.

Figure 6:
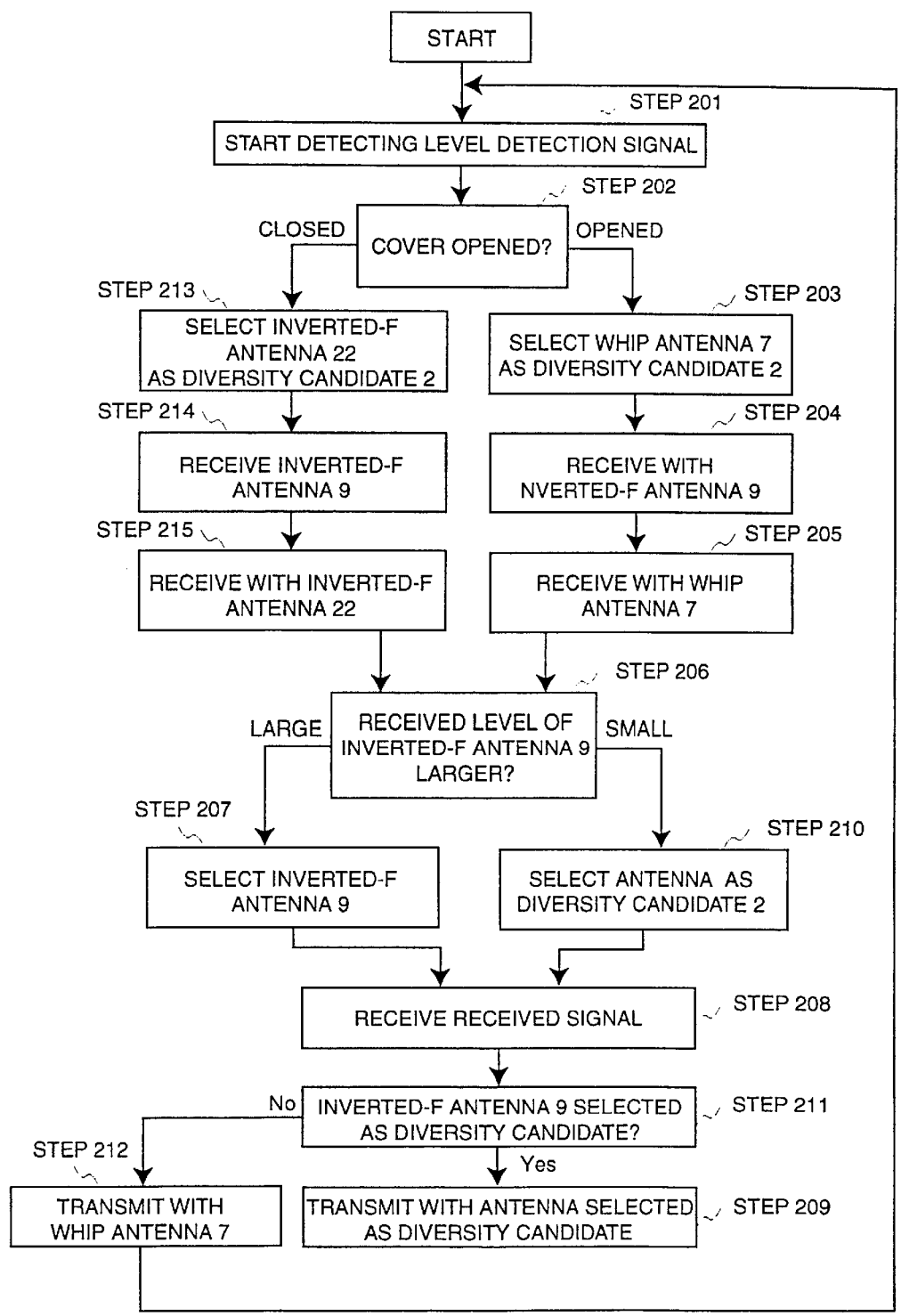
FIG. 6 is a flowchart illustrating the operation of the portable radio information terminal shown in FIG. 4, according to an embodiment of the present invention.

FIG. 6 is a flowchart illustrating the operation of the portable radio information terminal according to an embodiment shown in FIG. 4.

In the embodiment of FIG. 4, the portable radio information terminal repeatedly receives and transmits radio signals carrying data at short time intervals in millimeter second (mS). Hence, when plural antennas are used in the diversity operation mode, it is necessary to receive radio signals for reception level detection, different from the reception radio signals necessary as the original information at a reception starting time, by switching the antenna. The radio control section (the modulator and demodulator section 12A) is prepared to receive the reception level of a radio signal to be input to the receiving section 11 (step 102).

When the cover is in an open state ("open" in step 202), the radio control section controls the antenna switches 16 and 21 so as to select the inverted-F antenna 9 and the whip antenna 7 acting as another candidate antenna for antenna selective diversity reception (step 203). The radio control section first detects the reception level of a reception level detection radio signal with the inverted-F antenna 9 and then detects the reception level thereof with the whip antenna 7 (step 205). If the reception level of the inverted-F antenna 9 is larger than that of the whip antenna 7 ("large" in the step 206), the radio control section selects a radio signal from the inverted-F antenna 9 (step 207) and thus the receiving section 11 receives it as a reception signal (step 208). In the step 206, if the reception level of the whip antenna 7 is larger than that of the inverted-F antenna 9 ("small" in the step 206), the radio control section selects the signal from the whip antenna 7 as a reception radio signal (step 210) and the receiving section 11 receives a radio signal from the whip antenna 7 (step 208).

After reception of the reception radio signal, if the diversity-selected antenna is the inverted-F antenna 9, (Yes in the step 211), the radio control section transmits a transmission radio signal with the inverted-F antenna 9 diversity-selected (step 209). In the portable radio information terminal, the inverted-F antenna 9 is used as a transmission antenna because it can be arranged so as to obtain a high gain and can be isolated from the radio section 17A.

In the step 206 following the branch "open" in the step 202, if the reception level of the whip antenna 7 is larger than that of the inverted-F antenna 9 ("small" in the step 206), the radio control section selects the radio signal from the whip antenna 7 as an input signal to the receiving section 11 (step 210) and the reception section 11 receives the radio signal as an reception signal (step 208).

After reception of the reception radio signal, if the inverted-F antenna 9 is selected as the diversity-selected antenna (Yes in the step 211), it transmits the transmission radio signal (step 212). If the whip antenna 7 is selected as the diversity-selected antenna (No in the step 211), it transmits the transmission radio signal (step 212). After the transmitting operation, the next receiving operation is resumed (step 201).

When the cover 2A is in a closed state in the step 202 ("closed" in the step 202), the radio control section controls the antenna switches 16 and 21 so as to select the inverted-F antenna 9 and the inverted-F antenna acting as another candidate antenna which act as antenna for the antenna selective diversity reception (step 213). The radio control section first detects the reception level of a reception level detection radio signal using the inverted-F antenna 9 (step 214) and then detects the level thereof with inverted-F antenna 22 (step 215). If the reception level of the inverted-F antenna 9 is larger than that of the whip antenna 7 ("large" in the step 206), the radio control section selects the radio signal from the inverted-F antenna as an input signal to the receiving section 11 (step 207) and the receiving section 11 receives the radio signal as a reception signal (step 208).

After receiving the reception radio signal, if the inverted-F antenna 9 is the diversity-selected antenna (Yes in the step 211), it is used for transmission (step 209). If the reception level of the inverted-F antenna 22 is larger than that of the inverted-F antenna 9 ("small" in the step 206), the radio control section selects the radio signal from the inverted-F antenna 22 as an input signal to the receiving section 11 (step 210) and the receiving section 11 receives the radio signal as an input signal (step 208). After the inverted-F antenna 22 receives the reception radio signal, the transmission radio signal is transmitted with the whip antenna 7 (No in the step 211 and the step 212). In this case, the inverted-F antenna 22 selecting the diversity reception is not used for transmission because it is not isolated from the radio section 17. After the transmission of the transmission radio signal, the next receiving operation starts (step 201).

As described above, according to the present invention, the portable radio information terminal comprises a main body containing an information processing section; a cover containing a radio section and covering the front surface of the main body, wherein the back surface of the cover approaches the upper surface of the main body when the cover is closed and the back surface of the cover is parted from the upper surface of the main body when the cover is opened; a first antenna disposed on the end of the cover; a second antenna having a conductive plane which can effectively shield the magnetic-coupling to the cover; and a receiving section for receiving a reception radio signal with the second antenna when the cover is closed and for diversity-receiving the reception radio signal with the first antenna and the second antenna when the cover is opened. Consequently, when the cover is closed, the diversity reception and transmission of radio signals can be performed by selectively and suitably using plural antennas, without using only the whip antenna of which the gain decreases in a cover closed state. In the portable radio information terminal including the radio section built-in the cover and the control section built-in the main body, an excellent radio communication function can be realized with the high gain sustained, without being influenced by noises radiated from the main body.

Moreover, according to the present invention, the first antenna transmits radio signals when the cover is in an open state while the second antenna transmits radio signals when the cover is in a closed state. Moreover, likewise the second antenna, the third antenna includes the conductive plane of shielding the magnetic coupling to the main body. In this case, the radio signals are received under the diversity control of the first antenna and the second antenna when the cover is in a closed state while the diversity reception is performed with the second antenna and the third antenna when the cover Is in an open state. Thus, it can be further relieved that the radio section built-in the cover is adversely affected by noises produced from the main body.

The entire disclosure of Japanese Patent Application No. 9-350745 filed on Dec. 19, 1997 including specification, claims, drawing and summary are incorporated herein by reference in its entirety.

What is claimed is:

1. A portable radio information terminal comprising:
  a main body containing an information processing section;
  a cover containing a radio section and covering an upper surface of said main body, wherein the back surface of said cover approaches the upper surface of said main body when said cover is closed while the back surface of said cover is parted from the upper surface of said main body when said cover is opened;
  a first antenna disposed on an end of said cover;
  a second antenna disposed in said cover and having a conductive plane which blocks the magnetic coupling to said cover; and
  a receiving section for receiving a receive radio signal with said second antenna when said cover is closed and for diversity-receiving said receive radio signal with said first antenna and said second antenna when said cover is opened.

2. The portable radio information terminal defined in claim 1, wherein said first-antenna transmits a transmission radio signal from a transmission section when said cover is in an open state and wherein said second antenna transmits said transmission radio signal when said cover is in a close state.

3. The portable radio information terminal defined in claim 2, wherein said cover further includes a third antenna having a conductive plane which blocks the magnetic coupling to said main body; and wherein said receiving section performs diversity-reception using said first antenna and said second antenna when said cover is in an open state and performs diversity-reception using said second antenna and said third antenna when said cover is in a close state.

4. The portable radio information terminal defined in claim 1, wherein said first antenna comprises a whip antenna; and wherein said second antenna comprises an inverted-F antenna.

5. The portable radio information terminal defined in claim 1, wherein said conductive plane of said second antenna comprises a printed circuit board on which components for said radio section are mounted.

6. The portable radio information terminal defined in claim 1, wherein said conductive plane of said second antenna comprises a metal vapor-deposited on a case disposed on said cover.

7. The portable radio information terminal defined in claim 3, wherein said first antenna comprises a whip antenna; and wherein said second antenna comprises an inverted-F antenna and said third antenna comprises an inverted-F antenna.

8. A portable radio information terminal comprising:
  a main body containing an information processing section; and
  a cover mechanically coupled to said main body by means of a rotating shaft, said cover containing a radio section; wherein said cover covers an upper surface of said main body by rotating around said rotating shaft;
  said cover including a first antenna with one end disposed on the opposite end of said cover with respect to said rotating shaft and a second antenna including a grounded conductor disposed on the back surface thereof;
  said cover including a receiving section;
  wherein said second antenna receives a receive radio signal when said upper surface of said main body is closed with said cover and wherein said first antenna and said second antenna diversity-receive said receive radio signal with said first antenna and said second antenna when said upper surface of said main body is not closed with said cover.

9. The portable radio information terminal defined in claim 8, wherein said first antenna comprises a whip antenna; and wherein said second antenna comprises an inverted-F antenna.

10. The portable radio information terminal defined in claim 8, wherein said first antenna transmits a transmission radio signal from said transmission section when said cover is not closed; and wherein said second antenna transmits said transmission radio signal when said cover is closed.

11. A portable radio/information terminal, comprising:

a main body containing an information processor, a display, and an input section; and a cover with a first side hinged to said main body and that is movable between a closed position covering a surface of said main body having said display and said input section and an open position exposing said surface of said main body, said cover containing a radio receiver and transmitter, and an internal antenna having a conductive plane that blocks a magnetic coupling with said cover, said cover having an external whip antenna attached at a second side opposite said hinge; and an open/close detector for detecting when said cover is in the open position and the closed position, said radio receiver being connected to said open/close detector and receiving a radio signal only on said internal antenna when said cover is in the closed position and diversity receiving a radio signal on said external whip antenna and said internal antenna when said cover is in the open position.

12. The terminal of claim 11, wherein said conductive plane comprises a grounded shielding plate on an interior surface of said cover facing said main body when said cover is in the closed position, said internal antenna and said radio receiver and transmitter being between said grounded shielding plate and an exterior surface of said cover opposite said interior surface.

13. The terminal of claim 12, wherein said grounded shielding plate comprises a printed circuit board mounting at least part of said radio receiver and transmitter.

14. The terminal of claim 11, wherein said open/close detector is in said main body.

15. The terminal of claim 11, wherein said internal antenna comprises two separate antennas that diversity receive a radio signal when said cover in the closed position.

* * * * *